(12) United States Patent
Kim et al.

(10) Patent No.: US 10,476,058 B2
(45) Date of Patent: Nov. 12, 2019

(54) BATTERY MODULE

(71) Applicant: Samsung SDI Co., Ltd., Yongin-si, Gyeonggi-do (KR)

(72) Inventors: Junseop Kim, Yongin-si (KR); Daepyo Lee, Yongin-si (KR); Donghyun Kim, Yongin-si (KR); Heesung Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 417 days.

(21) Appl. No.: 15/141,497

(22) Filed: Apr. 28, 2016

(65) Prior Publication Data

US 2016/0322623 A1    Nov. 3, 2016

(30) Foreign Application Priority Data

Apr. 29, 2015    (KR) .................. 10-2015-0060713

(51) Int. Cl.
*H01M 2/10*    (2006.01)
*H01M 2/20*    (2006.01)
(Continued)

(52) U.S. Cl.
CPC ......... *H01M 2/1077* (2013.01); *H01M 2/206* (2013.01); *H01M 2/305* (2013.01);
(Continued)

(58) Field of Classification Search
CPC .... H02J 7/0042; H01M 2/1077; H01M 2/206; H01M 2/34; H01M 2/305; H01M 10/425;
(Continued)

(56) References Cited

U.S. PATENT DOCUMENTS

| 2005/0202315 A1 | 9/2005 | Sugeno et al. |
| 2012/0003520 A1 | 1/2012 | Lee et al. |

(Continued)

FOREIGN PATENT DOCUMENTS

| JP | 2003346772 A | * 12/2003 |
| JP | 2010-033913 A | 2/2010 |

(Continued)

OTHER PUBLICATIONS

Machine translation of JP-2003346772-A reliedi upon in the rejection. (Dec. 2003).*

*Primary Examiner* — Eugenia Wang
(74) *Attorney, Agent, or Firm* — Knobbe Martens Olson & Bear LLP

(57) ABSTRACT

A battery module is disclosed. In one aspect, the battery module includes first through third battery packs electrically connected to one another. The battery module also includes a bus pattern. The bus pattern includes i) a main body including an input/output point of a charging/discharging path and ii) first through third branching portions that branch from the main body and extend to first through third contact points of the first through third battery packs, respectively. A first distance is defined as the distance between the input/output point and the first contact point, a second distance is defined as the distance between the input/output point and the second contact point and a third distance is defined as the distance between the input/output point and the third contact point. The first distance is less than the second distance, and the second distance is less than the third distance.

19 Claims, 4 Drawing Sheets

(51) Int. Cl.
*H01M 2/30* (2006.01)
*H01M 2/34* (2006.01)
*H01M 10/42* (2006.01)

(52) U.S. Cl.
CPC ........... *H01M 2/34* (2013.01); *H01M 10/425* (2013.01); *H01M 2010/4271* (2013.01); *H01M 2200/00* (2013.01); *H01M 2200/103* (2013.01); *H01M 2220/20* (2013.01)

(58) Field of Classification Search
CPC ....... H01M 2200/00; H01M 2200/103; H01M 2010/4271; H01M 2220/20
See application file for complete search history.

(56) References Cited

U.S. PATENT DOCUMENTS

| | | | | |
|---|---|---|---|---|
| 2012/0214039 A1* | 8/2012 | Yoon | ........................ | H01M 2/02 |
| | | | | 429/99 |
| 2013/0052515 A1* | 2/2013 | Park | .................... | H01M 2/1077 |
| | | | | 429/159 |
| 2013/0089755 A1* | 4/2013 | Park | ...................... | H01M 2/202 |
| | | | | 429/7 |

FOREIGN PATENT DOCUMENTS

| | | | |
|---|---|---|---|
| JP | 2011-233319 A | 11/2011 | |
| KR | 10-2005-0075284 A | 7/2005 | |
| KR | 10-1103755 B1 | 1/2012 | |
| WO | WO-2013131548 A1 * | 9/2013 | ............ H01M 2/202 |

\* cited by examiner

BATTERY MODULE

CROSS-REFERENCE TO RELATED APPLICATION

This application claims the benefit of Korean Patent Application No. 10-2015-0060713, filed on Apr. 29, 2015, in the Korean Intellectual Property Office, the disclosure of which is incorporated herein in its entirety by reference.

BACKGROUND

Field

The described technology generally relates to battery modules.

Description of the Related Technology

Secondary (rechargeable) batteries are used as energy sources for mobile devices, electric vehicles, hybrid vehicles, and electric bicycles, or as uninterruptible power supplies. According to the types of devices that operate based on such batteries, the secondary batteries can be used in the form of one battery or a pack including multiple batteries electrically connected to one another and bound together to form a single package.

Small mobile devices, such as mobile phones, can operate according to the output and capacity of one battery for a predetermined amount of time. However, when long-time and high-power driving are necessary for electric vehicles with much power consumption and hybrid vehicles, a module including a number of batteries is necessary due to the higher output and capacity requirements. Thus, an output voltage or output current can increase according to the number of batteries built in a device.

SUMMARY OF CERTAIN INVENTIVE ASPECTS

One inventive aspect relates to a battery module in which a plurality of battery packs are electrically connected to one another and charging/discharging efficiency may be improved by designing a bus pattern for forming a charging/discharging path.

Another aspect is a battery module that includes: first through third battery packs electrically connected to one another; and a bus pattern comprising a main body including an input/output point of a charging/discharging path and first through third branching portions that branch from the main body and extend to first through third contact points of the first through third battery packs, respectively, wherein, along the bus pattern, a first distance from the input/output point to the first contact point<a second distance from the input/output point to the second contact point<a third distance from the input/output point to the third contact point, and a first current flow width of the first branching portion<a second current flow width of the second branching portion<a third current flow width of the third branching portion.

The bus pattern may electrically connect the first through third battery packs and may form charging/discharging paths between the input/output point and the first through third contact points.

The input/output point of the bus pattern may contact a master pack at a contact point, and the master pack may control a charging/discharging operation of the first through third battery packs.

A width of the main body of the bus pattern may be greatest.

A width of the main body of the bus pattern may be greater than the third current flow width.

The first through third current flow widths of the first through third branching portions may be minimum widths of the first through third branching portions.

A fuse portion may be formed in at least one of the first through third branching portions.

A width of the fuse portion formed in the at least one of the first through third branching portions may be a minimum width of the at least one of the first through third branching portions, and the fuse portion may be recessed from a side of the at least one of the first through third branching portions.

A current flow width of the at least one of the first through third branching portions may correspond to the width of the fuse portion formed in the at least one of the first through third branching portions.

The first through third battery packs each may include battery cells, an input/output terminal, and a case which accommodates the battery cells and exposes the input/output terminal, the first through third battery packs may include the same number of battery cells, and the first through third contact points of the bus pattern may be connected to the input/output terminals.

The battery module may further include a plate which accommodates the bus pattern and which is interposed between the bus pattern and the first through third battery packs.

The first through third contact points of the bus pattern may be screw-coupled to input/output terminals of the first through third battery packs, and screw members may pass through the first through third contact points and the plate and may be coupled to the input/output terminals.

The first through third branching portions may be formed in one of two directions perpendicular to a lengthwise direction of the main body of the bus pattern, and the battery module may further include fourth and fifth branching portions formed at a side of the main body of the bus pattern opposite a side on which the first through third branching portions are formed.

Another aspect is a battery module comprising: first through third battery packs electrically connected to one another; and a bus pattern comprising i) a main body including an input/output point of a charging/discharging path and ii) first through third branching portions that branch from the main body and extend to first through third contact points of the first through third battery packs, respectively, wherein, along the bus pattern, it first distance is defined as the distance between the input/output point and the first contact point, a second distance is defined as the distance between the input/output point and the second contact point and a third distance is defined as the distance between the input/output point and the third contact point, wherein the first distance is less than the second distance, and the second distance is less than the third distance and wherein a first current flow width of the first branching portion is less than a second current flow width of the second branching portion, and the second current flow width is less than a third current flow width of the third branching portion.

In the above battery module, the bus pattern electrically connects the first through third battery packs and forms charging/discharging paths between the input/output point and the first through third contact points. In the above battery module, the input/output point of the bus pattern contacts a master pack at a contact point, and wherein the master pack is configured to control a charging/discharging operation of the first through third battery packs. In the above battery module, the width of the main body of the bus pattern is greatest. In the above battery module, the width of the main body of the bus pattern is greater than the third current flow width.

In the above battery module, the first through third current flow widths of the first through third branching portions are the minimum widths of the first through third branching portions. The above battery module further comprises a fuse portion formed in at least one of the first through third branching portions. In the above battery module, the width of the fuse portion formed in the at least one of the first through third branching portions is the minimum width of the at least one of the first through third branching portions, and wherein the fuse portion is recessed from a side of the at least one of the first through third branching portions. In the above battery module, a current flow width of the at least one of the first through third branching portions corresponds to the width of the fuse portion formed in the at least one of the first through third branching portions.

In the above battery module, each of the first through third battery packs comprises battery cells, an input/output terminal, and a case which accommodates the battery cells and exposes the input/output terminal, wherein the first through third battery packs comprise the same number of battery cells, and wherein the first through third contact points of the bus pattern are connected to the input/output terminals. The above battery module further comprises a plate accommodating the bus pattern and interposed between the bus pattern and the first through third battery packs.

In the above battery module, the first through third contact points of the bus pattern are screw-coupled to input/output terminals of the first through third battery packs, and wherein screws pass through the first through third contact points and the plate and are coupled to the input/output terminals. In the above battery module, the first through third branching portions are formed in one of two directions substantially perpendicular to a lengthwise direction of the main body of the bus pattern, and wherein the battery module further comprises fourth and fifth branching portions formed at a side of the main body of the bus pattern opposite a side on which the first through third branching portions are formed. In the above battery module, at least one of the first through third branching portions includes a bent portion.

In the above battery module, at least two of the first through third branching portions includes bent portions that are bent in the same direction. In the above battery module, at least two of the first through third branching portions includes bent portions that are bent in different directions. In the above battery module, at least one of the first through third branching portions includes a bent portion, and wherein at least another one of the first through third branching portions does not include a bent portion.

Another aspect is a battery module comprising: first through third battery packs electrically connected to one another; and a bus pattern comprising i) a main body including an input/output point of a charging/discharging path and ii) first through third branching portions that branch from the main body and extend to first through third contact points of the first through third battery packs, respectively, wherein, along the bus pattern, a first distance is defined as the distance between the input/output point and the first contact point, a second distance is defined as the distance between the input/output point and the second contact point and a third distance is defined as the distance between the input/output point and the third contact point, and wherein the first distance is less than the second distance, and the second distance is less than the third distance.

In the above battery module, a first current flow width of the first branching portion is less than a second current flow width of the second branching portion, and the second current flow width is less than a third current flow width of the third branching portion. In the above battery module, at least one of the first through third branching portions includes a bent portion.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Figure 1:
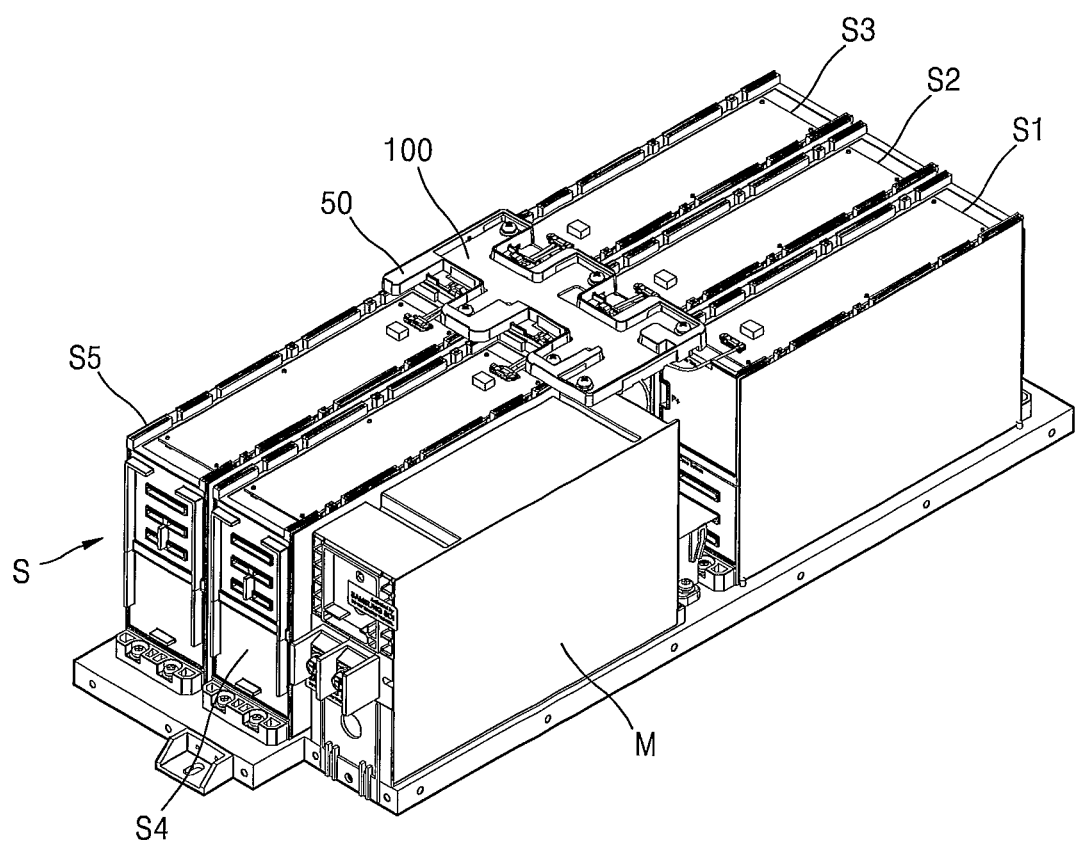
FIG. 1 is a perspective view of a battery module according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Hereinafter, a battery module according to an exemplary embodiment will be described with reference to the attached drawings.

Figure 2:
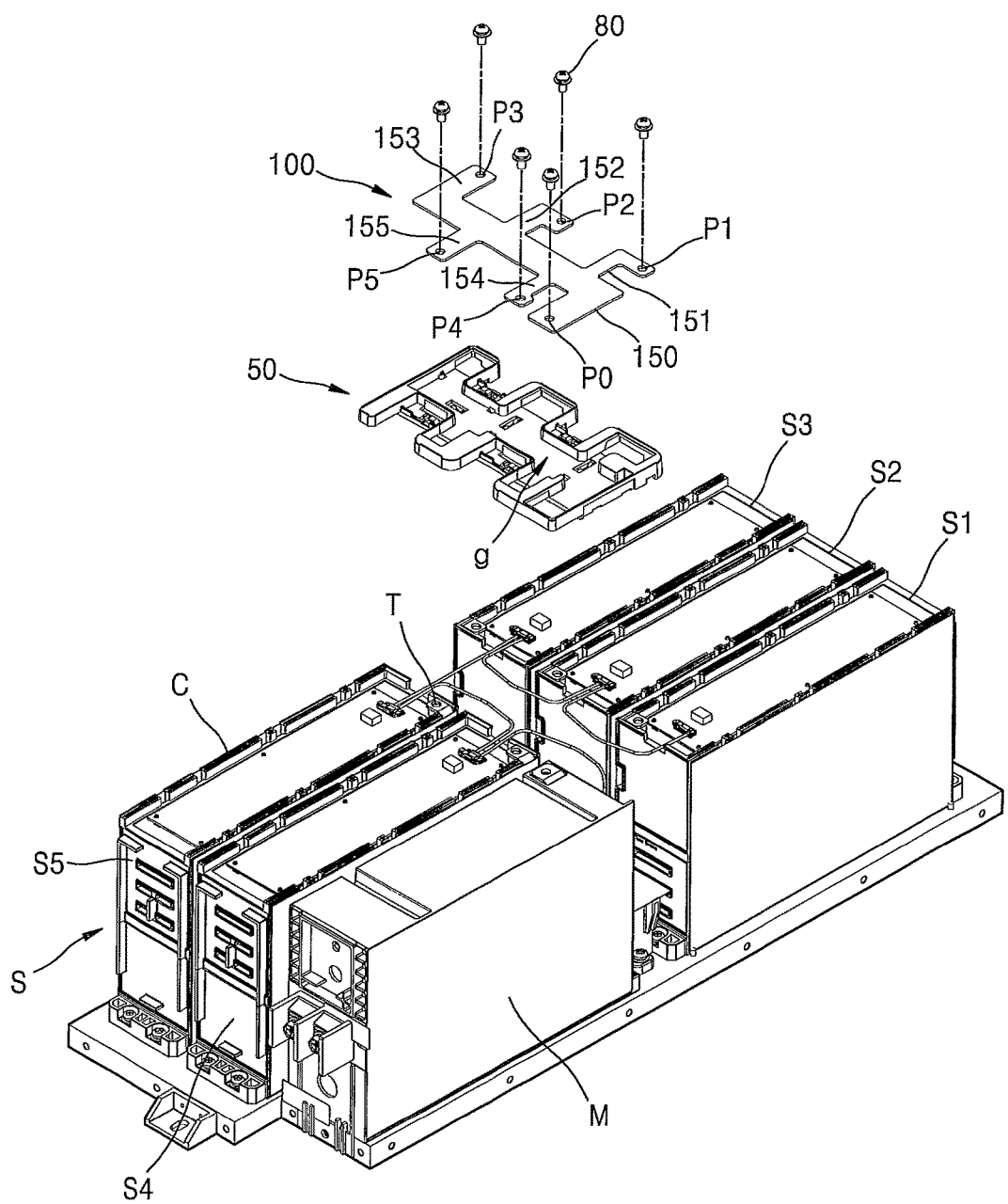
FIG. 2 is an exploded perspective view of the battery module illustrated in FIG. 1.

FIG. 1 is a perspective view of a battery module according to an exemplary embodiment. FIG. 2 is an exploded perspective view of the battery module illustrated in FIG. 1.

Referring to FIGS. 1 and 2, the battery module according to the current embodiment includes first through third battery packs S1, S2, and S3 that are electrically connected to one another, and a bus pattern 100 including a main body 150 including an input/output point P0 of a charging/discharging path and first through third branching parts 151, 152, and 153 that branch from the main body 150 and extend to first through third contact points P1, P2, and P3 of the first through third battery packs S1, S2, and S3, respectively.

The battery packs S include a plurality of battery cells (not shown) and a case C in which the battery cells are accommodated and through which input/output terminals T are exposed. For example, the first through third battery packs S1, S2, and S3 includes the same number of battery cells and may have substantially the same structure and shape.

The number of battery packs S included in the battery module according to the current embodiment may be doubled, and the battery module may be expanded for high-output usage. For example, the battery module may be expanded such that the battery packs S may be repeatedly placed to form a single unit which includes the battery packs S. The battery module may be configured by coupling the battery packs S according to a required output capacity. In this case, the battery packs S may be formed to have substantially the same structure.

According to an exemplary embodiment, the battery packs S having substantially the same structure may be connected to one another so that output performance may be doubled. In this case, the battery packs S have substantially the same structure and thus may flexibly cope with various output demands. For example, a relatively small number of battery packs are connected to one another for a required place in which a relatively low output is required, so that a battery module having a low output may be supplied, and a relatively large number of battery packs are connected to one another for a required place in which a relatively high output is required, so that a battery module having a high output may be supplied. Through the battery packs S that actively cope with various output demands and have substantially the same structure, production efficiency may be improved, and redundant investment for a design and production facility for production of the battery packs S having different structures according to each output demand may be prevented.

In an embodiment, the first through third battery packs S1, S2, and S3 have the same structure or substantially the same structure. Here, substantially the same structure may mean that the first through third battery packs S1, S2, and S3 do not have entirely the same shape and most of structures of the first through third battery packs S1, S2, and S3 are the same.

The bus pattern 100 electrically connects the first through third battery packs S1, S2, and S3 and forms a charging/discharging path. The bus pattern 100 may include the main body 150 including the input/output point P0 of the charging/discharging path and first through third branching parts 151, 152, 153 that extend from the main body 150.

The input/output point P0 of the charging/discharging path may mean a point in which discharging currents from the first through third battery packs S1, S2, and S3 are collected and are discharged to the outside of the bus pattern 100 and charging currents from the outside are distributed into the first through third branching parts 151, 152, and 153, thus the input/output point P0 may mean an electrical contact point between the bus pattern 100 and the outside.

For example, the input/output point P0 of the charging/discharging path is a position in which external devices, i.e., external loads or external charging devices are electrically connected. Through the input/output point P0, discharging currents from the first through third battery packs S1, S2, and S3 are collected, are discharged to the external loads, and discharging currents from the external charging devices may be divided into the first through third battery packs S1, S2, and S3.

In an exemplary embodiment, the input/output point P0 of the bus pattern 100 contacts a master pack M at a contact point, and the master pack M controls a charging/discharging operation of the first through third battery packs S1, S2, and S3. The master pack M may not include battery cells for supplying discharging currents to the external loads but may control the charging/discharging operation of the first through third battery packs S1, S2, and S3. For example, the master pack M monitors the charging/discharging operation of each battery pack S, collects status information regarding a current status of each battery pack S, and controls the charging/discharging operation of each battery pack S based on the collected status information. Furthermore, the master pack M may be formed on a path of a charging/discharging current and may take a protective measure, such as stopping the charging/discharging operation, in an abnormal situation, such as overcurrent, overdischarging, or overcharging.

The first through third branching parts 151, 152, and 153 may extend from the main body 150 of the bus pattern 100 to the first through third battery packs S1, S2, and S3. For example, the first through third branching parts 151, 152, and 153 branches from the main body 150 of the bus pattern 100 and extends to first through third contact points P1, P2, and P3 with the first through third battery packs S1, S2, and S3. The first through third branching parts 151, 152, and 153 may form a charging/discharging path between the main body 150 of the bus pattern 100 and the first through third battery packs S1, S2, and S3.

The first through third contact points P1, P2, and P3 of the first through third branching parts 151, 152, and 153 correspond to electrical connection positions with the first through third battery packs S1, S2, and S3. For example, the first through third contact points P1, P2, and P3 are connected to input/output terminals T of the first through third battery packs S1, S2, and S3. Furthermore, through screw members 80 that pass through the first through third contact points P1, P2, and P3 of the bus pattern 100 and are coupled to the input/output terminals T of the first through third battery packs S1, S2, and S3, the first through third contact points P1, P2, and P3 may be electrically connected to each battery pack S.

The bus pattern 100 electrically and structurally couples the first through third battery packs S1, S2, and S3. That is, the bus pattern 100 may form electrical connections between the first through third battery packs S1, S2, and S3 through the first through third contact points P1, P2, and P3 and may fix the first through third battery packs S1, S2, and S3 to positions designated by the first through third contact points P1, P2, and P3. The bus pattern 100 may electrically connect the first through third battery packs S1, S2, and S3, and simultaneously, structurally bind the first through third battery packs S1, S2, and S3.

The bus pattern 100 may fix the first through third battery packs S1, S2, and S3 in right positions robustly so that collision of adjacent battery packs S caused by vibration or movement of the battery packs S may be prevented.

The bus pattern 100 may be integrally formed. For example, the bus pattern 100 includes the main body 150 and first through fifth branching portions 151 through 155, which are integrally formed. The bus pattern 100 may be provided as a metal plate patterned according to the charging/discharging path. For example, the bus pattern 100 is provided as a metal plate formed of aluminum, nickel, or copper having excellent electrical conductivity. The bus pattern 100 may form electrical connections between the first through third battery packs S1, S2, and S3 and may bind the first through third battery packs S1, S2, and S3 structurally. Thus, the bus pattern 100 may be formed from a metal plate having sufficient mechanical rigidity rather than a flexible wire.

Figure 3:
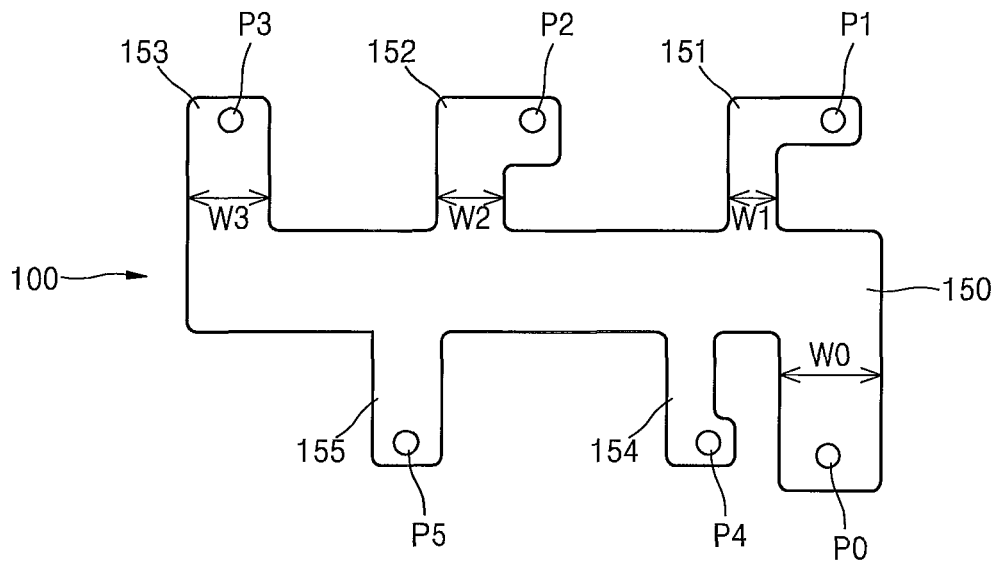
FIGS. 3 and 4 are views for describing a structure of a bus pattern.
Figure 4:
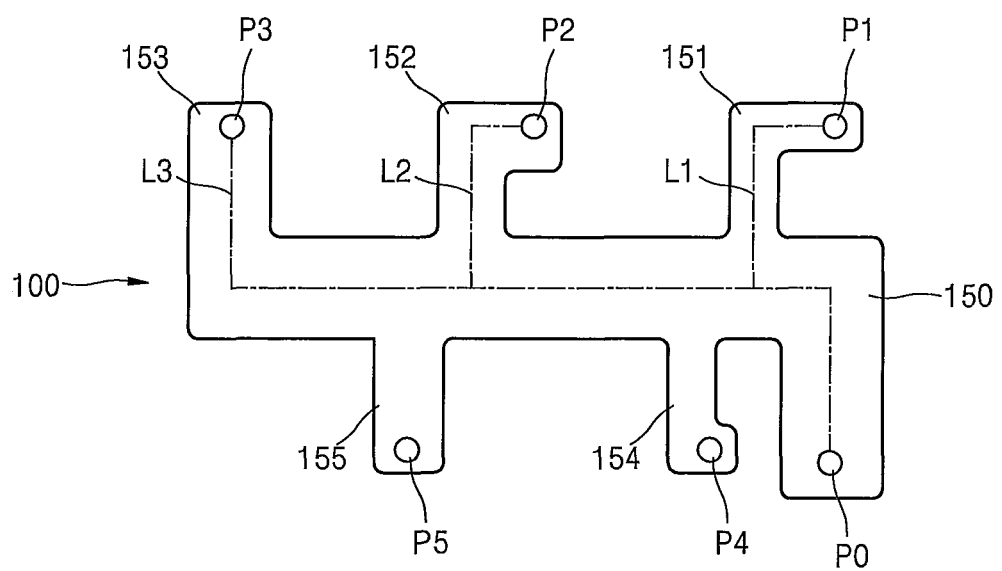

FIGS. 3 and 4 are views for describing a structure of the bus pattern 100.

Referring to FIGS. 3 and 4, a design of the bus pattern 100 will now be described. That is, along the bus pattern 100, a first distance is defined as the distance between the input/output point P0 and the first contact point P1, a second distance is defined as the distance between the input/output point P0 and the second contact point P2, and a third distance is defined as the distance between the input/output point P and the third contact point P3. In some embodiments, the third distance is greater than the second distance which is greater than the first distance. Furthermore, a first current flow width W1 of the first branching portion 151 is less than a second current flow width W2 of the second branching portion 152 which is less than a third current flow width W3 of the third branching portion 153. In some embodiments, at least one of the branching portions 151-155 includes a bent portion. For examples, as shown in FIGS. 3 and 4, the branching portions 151-152 and 154 include bent portions. However, at least one of the branching portions 153 and 155 can also include a bent portion. Furthermore, the bent portions can be bent in the same direction. Alternatively, some of the bent portions can be bent in one direction and other bent portions can be bent in another different direction (e.g., opposite direction). This applies to the embodiment of FIGS. 5 and 6.

The first through third branching portions 151, 152, and 153 form electrical paths between the input/output point P0 and the first through third contact points P1, P2, and P3. In this case, the first through third branching portions 151, 152, and 153 may be designed such that resistances thereof are substantially equal to one another, and thus uniform currents may be drawn from the first through third battery packs S1, S2, and S3. For example, the first through third battery packs S1, S2, and S3 may be connected in parallel, and a discharging current drawn via the input/output point P0 may be substantially equally drawn from the first through third battery packs S1, S2, and S3. If currents are drawn from only one battery pack S, rapid voltage drops occurring in the battery pack S may reduce the overall charging/discharging efficiency thereof. That is, in order to improve charging/discharging efficiency of the entire battery module, the voltage of a battery pack S may be maintained to be substantially equal to the voltages of other battery packs (i.e., the voltages of the first through fifth battery packs S1 through S5 may be maintained to be substantially equal to one another).

The first through third branching portions 151, 152, and 153 that form electrical paths of the first through third battery packs S1, S2, and S3 may be designed to have the same electrical resistance. The current flow widths W1, W2, and W3 of the first through third branching portions 151, 152, and 153 may differ according to distances between the first through third contact points P1, P2, and P3 and the input/output point P0. For example, the first through third current flow widths W1, W2, and W3 of the first through third branching portions 151, 152, and 153 that connect the first through third contact points P1, P2, and P3 to the input/output point P0 increase as the distance between the first through third contact points P1, P2, and P3 and the input/output point P0 increases so that electrical resistances of the first through third branching portions 151, 152, and 153 may be substantially equal to one another. The first through third current flow widths W1, W2, and W3 of the first through third branching portions 151, 152, and 153 are designed to differ so that electrical resistances of the first through third branching portions 151, 152, and 153 may be substantially equally formed. In this case, it is assumed that thicknesses of the first through third branching portions 151, 152, and 153 are uniform. When cross-sectional areas of the first through third branching portions 151, 152, and 153 that affect electrical resistances are determined by the first through third current flow widths W1, W2, and W3, by uniformly fixing the thicknesses of the first through third branching portions 151, 152, and 153, the first through third current flow widths W1, W2, and W3 of the first through third branching portions 151, 152, and 153 may be factors for determining electrical resistances.

Referring to FIG. 4, the first through third distances L1, L2, and L3 that are lengths extending along the bus pattern 100 may represent approximately electrical paths between the input/output point P0 and the first through third contact points P1, P2, and P3. Substantially, the electrical paths between the input/output point P0 and the first through third contact points P1, P2, and P3 may differ from the first through third distances L1, L2, and L3. However, considering that an electrical flow through the bus pattern 100 is a large current, a large amount of electrons are filled in the bus pattern 100 and flow through the bus pattern 100 so that, in this viewpoint, the first through third distances L1, L2, and L3 may be understood to represent electrical paths.

The first through third current flow widths W1, W2, and W3 of the first through third branching portions 151, 152, and 153 correspond to minimum widths along lengthwise directions of the first through third branching portions 151, 152, and 153. The minimum widths of the first through third branching portions 151, 152, and 153 serve as limitation factors for limiting the flow of current. Thus, electrical resistances are affected by the minimum widths of the first through third branching portions 151, 152, and 153.

To sum up, the first through third branching portions 151, 152, and 153 are designed as different current flow widths W1, W2, and W3 according to the first through third distances L1, L2, and L3 from the input/output point P0 to the first through third contact points P1, P2, and P3. In this case, the current flow widths W1, W2, and W3 correspond to minimum widths that serve as limitation factors for limiting the flow of current in the first through third branching portions 151, 152, and 153. In an exemplary embodiment illustrated in the drawings, each of the first through third branching portions 151, 152, and 153 is formed to have a substantially uniform width along the length direction so that the first through third current flow widths W1, W2, and W3 of the first through third branching portions 151, 152, and 153 correspond to the widths of the first through third branching portions 151, 152, and 153. However, in another exemplary embodiment, fuse portions are formed in the first through third branching portions 151, 152, and 153. In this case, the first through third current flow portions 151, 152, and 153 may correspond to minimum widths formed by the fuse portions. This will be described later in detail.

Since the charging/discharging current of the first through third battery packs S1, S2, and S3 is collected in the main body 150 of the bus pattern 100 and the main body 150 of the bus pattern 100 copes with the largest current, the main body 150 of the bus pattern 100 may be formed to have a larger current flow width W0 than those of the first through branching portions 151, 152, and 153. For example, the main body 150 of the bus pattern 100 is formed to have a larger current flow width than the third current flow width W3 of the first branching portion 151.

Referring to FIG. 2, an accommodation plate 50 is placed between the bus pattern 100 and the first through third battery packs S1, S2, and S3. The accommodation plate 50 is used to accommodate the bus pattern 100 and to perform electrical insulation between the bus pattern 100 and the battery pack S. The accommodation plate 50 may be formed of an electrical insulating material. An accommodation groove in which the bus pattern 100 is accommodated, may be formed in the accommodation plate 50.

Since the bus pattern 100 binds different battery packs S structurally and modulates the bound battery packs S, the bus pattern 100 may be formed over different battery packs S. For example, since, in FIG. 2, the bus pattern 100 binds first through fifth battery packs S1 through S5 to one another, the bus pattern 100 may be formed over the first through fifth battery packs S1 through S5, and the accommodation plate 50 may be placed between the bus pattern 100 and the first through fifth battery packs S1 through S5.

First through fifth contact points P1 through P5 of the bus pattern 100 may be screw-coupled to the input/output terminals T of the first through fifth battery packs S1 through S5. The screw members 80 may pass through the first through fifth contact points P1 through P5 and the accommodation plate 50 and may be fastened to the input/output terminals T.

The first through third branching portions 151, 152, and 153 can be formed in one of two directions substantially perpendicular to a lengthwise direction of the main body 150 of the bus pattern 100. For example, in an exemplary embodiment, the bus pattern 100 electrically connects the first through fifth battery packs S1 through S5 and binds them structurally. In this case, the first through third battery packs S1 through S3 may be placed in one of two directions based on the bus pattern 100, and a master pack M and the fourth and fifth battery packs S4 and S5 may be placed at a side of the main body 150 of the bus pattern 100 opposite to a side on which the first through third battery packs S1, S2, and S3 are placed. In this way, three packs M and S are placed on both sides of the bus pattern 100 so that a balanced exterior may be formed and a compact configuration having no dead space may be realized.

The battery module according to an exemplary embodiment includes first through fifth battery packs S1 through S5 connected in parallel. The bus pattern 100 placed on the first through fifth battery packs S1 through S5 may be connected to positive electrode input/output terminals T of the first through fifth battery packs S1 through S5, and another bus pattern (not shown) placed under the first through fifth battery packs S1 through S5 may be connected to negative electrode input/output terminals (not shown) of the first through fifth battery packs S1 through S5. The above-described design of the bus pattern 100 may be applied to at least one of the bus patterns 100 placed on and under the first through fifth battery packs S1 through S5.

The bus patterns 100 placed on and under the first through fifth battery packs S1 through S5 may be placed in opposite sides in a vertical direction of the first through fifth battery packs S1 through S5. These bus patterns 100 may be designed to have substantially the same structure. The accommodation plate 50 may be placed between the bus patterns 100 placed on and under the first through fifth battery packs S1 through S5 and the battery pack S.

Figure 5:
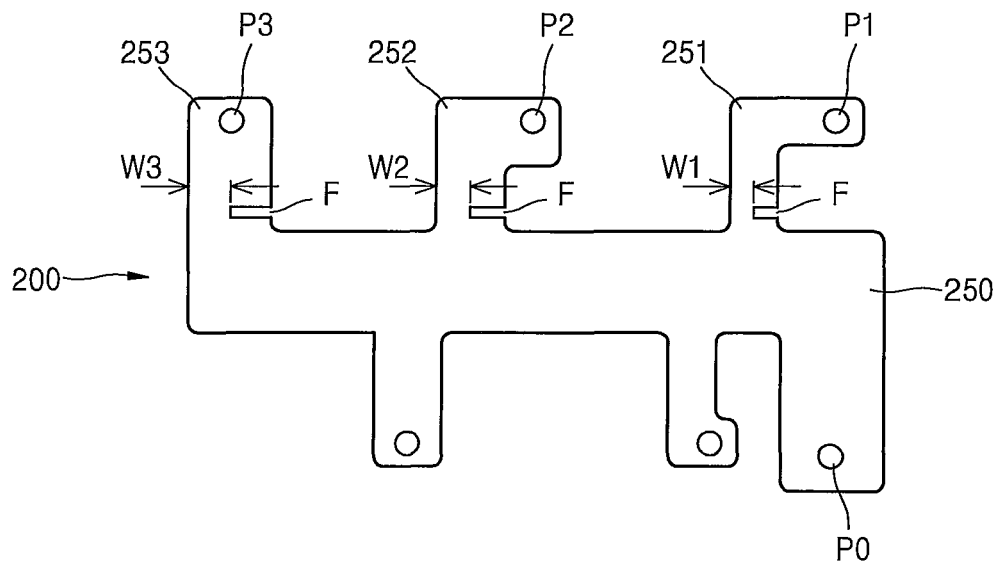
FIGS. 5 and 6 are views for describing modified embodiments of the bus pattern illustrated in FIG. 3.
Figure 6:
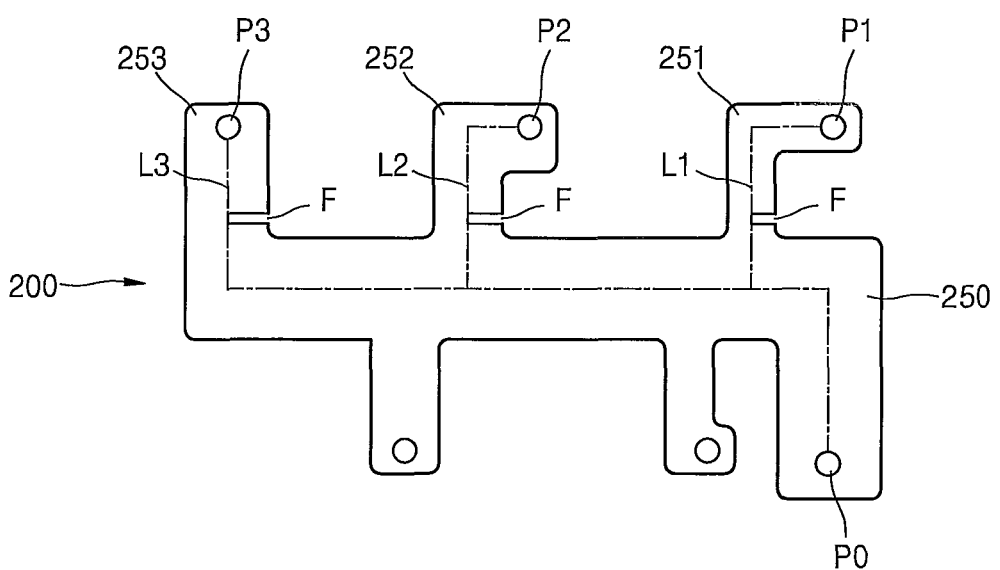

FIGS. 5 and 6 are views for describing modified embodiments of the bus pattern illustrated in FIG. 3.

Referring to FIGS. 5 and 6, a bus pattern 200 includes a main body 150 including an input/output point P0 of a charging/discharging path and first through third branching portions 251, 252, and 253 that branch from the main body 150 and extend to the first through third contact points P1, P2, and P3 with the first through third battery packs S1, S2, and S3.

In the current embodiment, a fuse portion F is formed in the bus pattern 100. The fuse portion F may respond to overcurrent that exceeds a predetermined current or overheating that exceeds a predetermined threshold temperature and may block a current path. The fuse portion F may block the current path by responding to overcurrent or overheating so that a safety measure for preventing explosion or ignition of the battery pack S may be taken.

In some embodiments, the fuse portion F is formed in the first through third branching portions 251, 252, and 253 of the bus pattern 100. For example, the fuse portion F is selectively formed in at least one of the first through third branching portions 251, 252, and 253 of the bus pattern 100. Furthermore, the fuse portion F may be formed in the first through third branching portions 251, 252, and 253. The fuse portion F may be recessed from a side of the at least one of the first through third branching portions 251, 252, and 253, and a width of the fuse portion F formed in the at least one of the first through third branching portions is a minimum width of the at least one of the first through third branching portions 251, 252, and 253. The flow of current is limited by the fuse portion F formed to have a minimum width so that resistance heat is collected and the fuse portion F is disconnected in an overcurrent or overheating situation that exceeds a predetermined allowance range, and the current is blocked.

With respect to design of the bus pattern 200, first through third current flow widths W1, W2, and W3 of the first through third branching portions 251, 252, and 253 are differently designed according to first through third distances L1, L2, and L3 from the input/output point P0 of the charging/discharging path to the first through third contact points P1, P2, and P3. In this case, the first through third current flow widths W1, W2, and W3 of the first through third branching portions 251, 252, and 253 correspond to minimum widths of the first through third branching portions 251, 252, and 253, which correspond to the minimum width of the fuse portion F. The first through third current flow widths W1, W2, and W3 of the first through third branching portions 251, 252, and 253 are used to determine electrical resistances of the first through third branching portions 251, 252, and 253 and refer to the smallest minimum width as limitation factor for limiting the flow of current in the first through third branching portions 251, 252, and 253.

In some embodiments, when the first through third distances L1, L2, and L3 from the input/output point P0 to the first through third contact points P1, P2, and P3 along the bus pattern 200 are designed as the first distance L1 being less than the second distance L2 which is less than the third distance L3. Furthermore, the first through third current flow widths W1, W2, and W3 of the first through third branching parts 251, 252, and 253 may be designed as the first current flow width W1 being less than the second current flow width W2 which is less than the third current flow width W3. This design is provided to enlarge the first through third current flow widths W1, W2, and W3 so that, as the first through third distances L1, L2, and L3 from the input/output point P0 to the first through third contact points P1, P2, and P3 are increased, electrical resistances may be reduced, and contrary to this, as the first through third distances L1, L2, and L3 from the input/output point P0 to the first through third contact points P1, P2, and P3 are reduced, the first through third current flow widths W1, W2, and W3 are limited to be small for balance of the electrical resistances.

The first through third contact points P1, P2, and P3 may be screw-coupled to input/output terminals T of the first through third battery packs S1, S2, and S3. Screw members 80 may pass through the first through third contact points P1, P2, and P3 of the bus pattern 200 and the accommodation plate 50 and may be coupled to the input/output terminals T of the first through third battery packs S1, S2, and S3.

The bus pattern 200 electrically connects the first through third battery packs S1, S2, and S3, binds the first through third battery packs S1, S2, and S3 structurally, modulates the first through third battery packs S1, S2, and S3, and fixes relative positions of the first through third battery packs S1, S2, and S3 firmly. Through this configuration, vibration or movement of the battery pack S and collision with adjacent battery packs are prevented using the bus pattern 200 so that damage of the battery pack S may be prevented.

The bus pattern 200 may be provided as a rigid metal plate rather than a flexible wire. By disposing the bus pattern 200, each battery pack S may be solidly bound, and a position of each battery pack S may be solidly fixed. For example, the bus pattern 200 may be formed of a metal material having excellent conduction characteristics or a metal plate patterned along an electrical path.

As described above, through a design of a bus pattern that electrically connects a plurality of battery packs one another and forms a charging/discharging path, charging/discharging efficiency may be improved.

In the design of the bus pattern, electrical resistances of branching portions that form an electrical path between battery packs from an input/output point are equally designed so that uniform current may be drawn from each battery pack and required power of each battery pack may be equally maintained and the entire charging/discharging efficiency may be improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A battery module comprising:
   first through third battery packs different from each other; and
   a bus pattern disposed outside the first through third battery packs and electrically connecting the first through third battery packs to one another and comprising i) a main body including a single input/output point of a charging/discharging path and ii) first through third branching portions that branch from the main body and include first through third contact points respectively connected to the first through third battery packs, wherein the single input/output point of the main body is configured to collect discharging currents received from the first through third battery packs and discharge the currents to an external device and distribute charging currents received from the external device to the first through third branching portions,
   wherein, along the bus pattern, a first distance is defined as the distance between the single input/output point and the first contact point, a second distance is defined as the distance between the single input/output point and the second contact point and a third distance is defined as the distance between the single input/output point and the third contact point, wherein the first distance is less than the second distance, and the second distance is less than the third distance, and
   wherein a first current flow width of the first branching portion is less than a second current flow width of the second branching portion, and the second current flow width is less than a third current flow width of the third branching portion,
   wherein each of the first through third battery packs comprises a plurality of battery cells, an input/output terminal for the battery cells, and a case which accommodates the battery cells and exposes the input/output terminal, wherein the first through third contact points of the bus pattern are connected to the input/output terminal of the battery cells, and
   wherein the bus pattern directly connects the single input/output point and each of the first through third contact points connected to the input/output terminal of the first through third battery packs.

2. The battery module of claim 1, wherein the bus pattern forms charging/discharging paths between the single input/output point and the first through third contact points.

3. The battery module of claim 1, wherein the single input/output point of the bus pattern contacts a master pack at a contact point, and wherein the master pack is configured to control a charging/discharging operation of the first through third battery packs.

4. The battery module of claim 1, wherein a width of the main body of the bus pattern is greatest.

5. The battery module of claim 1, wherein a width of the main body of the bus pattern is greater than the third current flow width.

6. The battery module of claim 1, wherein the first through third current flow widths of the first through third branching portions are minimum widths of the first through third branching portions.

7. The battery module of claim 1, further comprising a fuse portion formed in at least one of the first through third branching portions.

8. The battery module of claim 7, wherein a width of the fuse portion formed in the at least one of the first through third branching portions is a minimum width of the at least one of the first through third branching portions, and wherein the fuse portion is recessed from a side of the at least one of the first through third branching portions.

9. The battery module of claim 8, wherein a current flow width of the at least one of the first through third branching portions corresponds to the width of the fuse portion formed in the at least one of the first through third branching portions.

10. The battery module of claim 1, further comprising a plate accommodating the bus pattern and interposed between the bus pattern and the first through third battery packs.

11. The battery module of claim 10, wherein the first through third contact points of the bus pattern are screw-coupled to input/output terminals of the first through third battery packs, and wherein screws pass through the first through third contact points and the plate and are coupled to the input/output terminals.

12. The battery module of claim 1, wherein the first through third branching portions are formed in one of two directions substantially perpendicular to a lengthwise direction of the main body of the bus pattern, and wherein the battery module further comprises fourth and fifth branching portions formed at a side of the main body of the bus pattern opposite a side on which the first through third branching portions are formed.

13. The battery module of claim 1, wherein at least one of the first through third branching portions includes a bent portion.

14. The battery module of claim 13, wherein at least two of the first through third branching portions include bent portions that are bent in the same direction.

15. The battery module of claim 13, wherein at least two of the first through third branching portions include bent portions that are bent in different directions.

16. The battery module of claim 1, wherein at least one of the first through third branching portions includes a bent portion, and wherein at least another one of the first through third branching portions does not include a bent portion.

17. A battery module comprising:
first through third battery packs different from each other; and
a bus pattern disposed outside the first through third battery packs and electrically connecting the first through third battery packs to one another and comprising i) a main body including a single input/output point of a charging/discharging path and ii) first through third branching portions that branch from the main body and include first through third contact points respectively connected to the first through third battery packs, wherein the single input/output point of the main body is configured to collect discharging currents received from the first through third battery packs and discharge the currents to an external device and distribute charging currents received from the external device to the first through third branching portions,
wherein, along the bus pattern, a first distance is defined as the distance between the single input/output point and the first contact point, a second distance is defined as the distance between the single input/output point and the second contact point and a third distance is defined as the distance between the single input/output point and the third contact point, and wherein the first distance is less than the second distance, and the second distance is less than the third distance,
wherein each of the first through third battery packs comprises a plurality of battery cells, an input/output terminal for the battery cells, and a case which accommodates the battery cells and exposes the input/output terminal, wherein the first through third contact points of the bus pattern are connected to the input/output terminal of the battery cells, and
wherein the bus pattern directly connects the single input/output point and each of the first through third contact points connected to the input/output terminal of the first through third battery packs.

18. The battery module of claim 17, wherein a first current flow width of the first branching portion is less than a second current flow width of the second branching portion, and the second current flow width is less than a third current flow width of the third branching portion.

19. The battery module of claim 17, wherein at least one of the first through third branching portions includes a bent portion.

* * * * *